US005528981A

United States Patent [19]
Pettit

[11] Patent Number: 5,528,981
[45] Date of Patent: Jun. 25, 1996

[54] SANDWICH BUN MOLD

[76] Inventor: James A. Pettit, 12673 Gardenside Dr., North Royalton, Ohio 44135

[21] Appl. No.: 427,240

[22] Filed: Apr. 24, 1995

[51] Int. Cl.$^6$ .................................................. A23D 1/00
[52] U.S. Cl. ............................ 99/428; 99/441; 249/142
[58] Field of Search ........................... 99/441, 428, 426, 99/353; 249/142

[56] References Cited

U.S. PATENT DOCUMENTS

| 2,937,095 | 5/1960 | Zitin | 99/428 |
| 3,341,167 | 9/1967 | Weiss | 249/142 |
| 4,212,234 | 7/1980 | DeCourcy | 99/441 |
| 5,359,924 | 11/1994 | Roberts et al. | 99/441 |

Primary Examiner—Stephen F. Gerrity
Assistant Examiner—Reginald L. Alexander
Attorney, Agent, or Firm—Renner, Kenner, Greive, Bobak, Taylor & Weber

[57] ABSTRACT

A baking mold (10) for sandwich rolls having an interior sandwich component cavity, includes a retaining member (11) and a form member (12). The retaining member (11) is a generally hollow cylinder having a circumferential side wall (15). The form member (12) includes a cylindrical slug (18), a spacer rail (19) and a support portion (20). The support portion (20) includes a U-shaped handle (30) and a semi-cylindrical support strap (31). The form member (12) is fitted into the retaining member (11) such that the spacer rail (19) engages the interior of the circumferential side wall (15) and the semi-cylindrical support strap (31) engages the exterior of the circumferential side wall (15) so as to positively position the form member (12) in a fixed spatial relationship within the retaining member (11). The retaining member (11) is partially filled with dough which is allowed to rise prior to assembly. Thus, the mold (10) serves to produce a sandwich roll having an enclosed cylindrical sandwich component cavity.

13 Claims, 4 Drawing Sheets

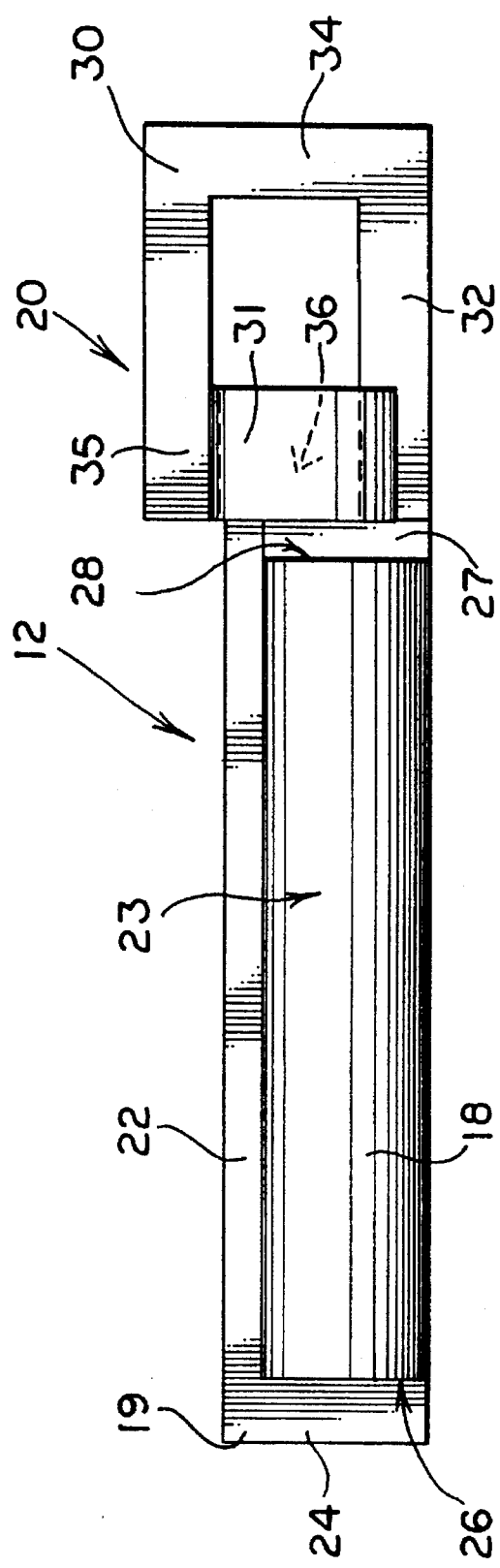
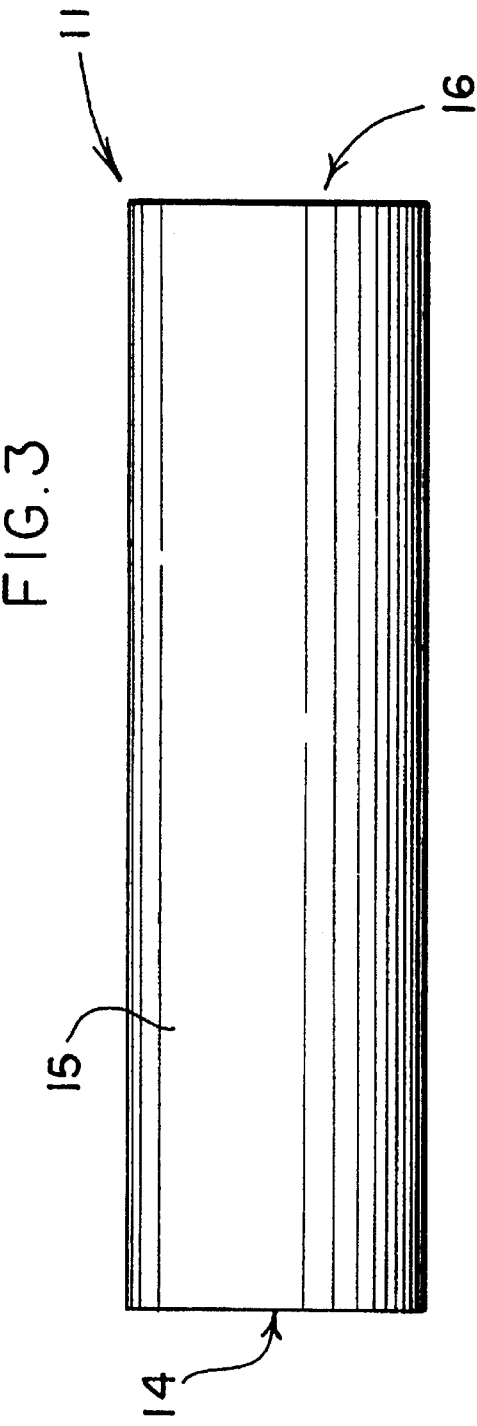
FIG. 3
FIG. 4

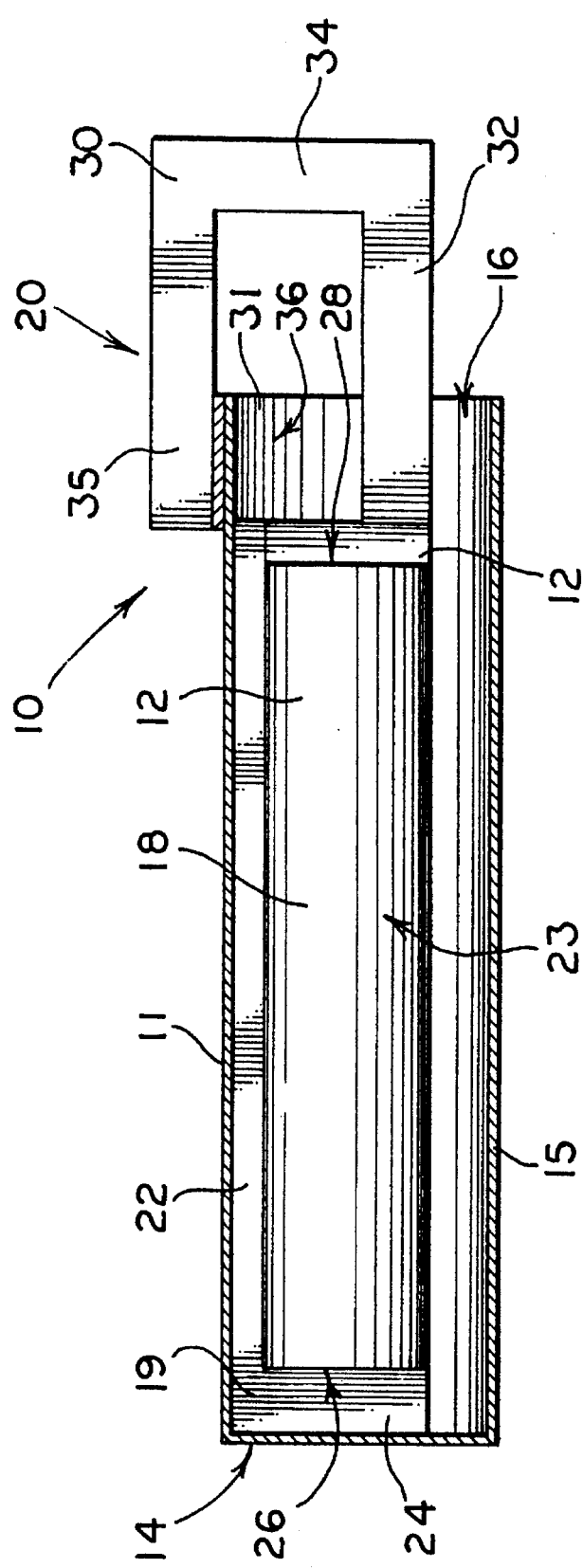
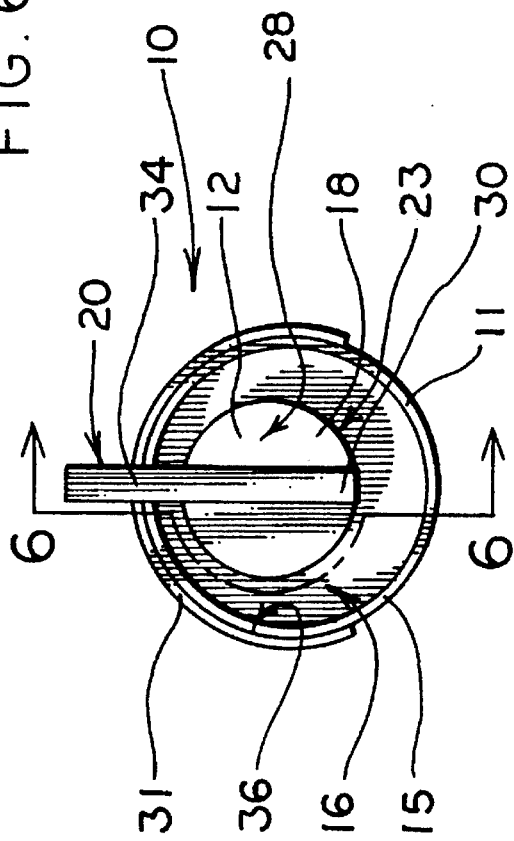
FIG. 6
FIG. 5

SANDWICH BUN MOLD

TECHNICAL FIELD

This invention relates to baking molds. More particularly, this invention relates to a baking mold for sandwich buns or rolls. Specifically, this invention relates to a two-piece baking mold for producing a generally cylindrical sandwich bun or roll having a cylindrical cavity for receiving miscellaneous sandwich components.

BACKGROUND ART

For many years, it has been known to use baking molds in the form of pans for cakes, pies, and the like. However, sandwich buns or rolls, such as hot dog or hamburger rolls, typically are not baked in molds or shaped pans, but are instead formed in loaves having a particular shape. The problem with such "loaf" methods is that the buns or rolls produced must be sliced to be used for sandwiches. Such slicing creates a generally planar surface for the receipt of sandwich components, making for a messy or unwieldy sandwich when used with certain condiments or sandwich components. It is partially for this reason that there has been a recent increase in the use of so-called pita bread, bread bowls, and tortilla shells for making sandwiches. However, some individuals prefer the more substantial raised bread used with traditional sandwich rolls. Thus, despite their messy disadvantage, the known sandwich buns or rolls continue to be widely used.

DISCLOSURE OF THE INVENTION

It is thus a primary object of the present invention to provide a baking mold for producing sandwich buns or rolls.

It is another object of the present invention to provide such a mold, as above, for producing raised bread products.

It is a further object of the present invention to provide a baking mold, as above, which is capable of producing a bun or roll having a sandwich component cavity.

It is yet another object of the present invention to provide a baking mold, as above, which is easy to use, inexpensive, and lends itself to automated production of sandwich buns or rolls.

These and other objects of the present invention, which will become apparent from the description to follow, are accomplished by the improvements hereinafter described and claimed.

In general, a baking mold, according to the present invention, is to be utilized to produce a sandwich roll having an interior sandwich component cavity. The baking mold includes retaining means for holding a portion of dough during the baking process. Form means are received in the retaining means for forming a cavity in the roll or bun. Support means position the form means within the retaining means.

More particularly, the retaining means includes a retaining member which includes a hollow cylinder having a closed end, a circumferential side wall, and an open end opposite the closed end. The form means has a cylindrical slug portion and a spacer portion extending outwardly from the cylindrical slug portion. The support means has a handle portion connected to the slug portion and a support strap which depends from the handle portion.

The spacer portion of the form member includes a generally flat rail member having first, second and third portions. The first portion extends radially outward from the cylindrical slug portion co-extensive with the longitudinal axis thereof. The second portion extends axially from the first end of the cylindrical slug portion across the central diameter thereof lying on a common plane with the first portion. The third portion extends axially from the second end of the cylindrical slug portion across the central diameter thereof lying on a common plane with the first and second portions. The handle portion of the support means includes first, second and third legs. The first leg extends axially from the second end of the cylindrical slug portion. The second leg extends orthogonally from the first leg and along the common plane formed by the first, second and third portions of the rail member. The third leg extends orthogonally from the second leg parallel to the first leg such that the distance between the third leg and the first portion of the rail member is approximately equal to the combined thicknesses of the circumferential side wall and the support strap. The support strap is of a semi-cylindrical shape and has an inside radius approximating the outside radius of the circumferential side wall of the retaining member. As such, when the form members are inserted in the retaining member, the strap member rests on the circumferential side wall and the first and second portions of the rail member engage the interior of the circumferential side wall and the closed end wall respectively so as to position the form member in a fixed spatial relationship with the retaining member.

A preferred exemplary baking mold assembly incorporating the concepts of the present invention is shown by way of example in the accompanying drawings without attempting to show all of the various forms and modifications in which the invention might be embodied, the invention being measured by the appended claims and not by the details of the specification.

BRIEF DESCRIPTION OF THE DRAWINGS

FIG. 3 is an elevational view of the form member.

FIG. 4 is an elevational view of the retaining cylinder member shown in FIG. 1.

FIG. 5 is an elevational end view of the assembled mold.

FIG. 6 is a sectional view of the mold of FIG. 5 taken substantially along the line 6—6.

PREFERRED EMBODIMENT FOR CARRYING OUT THE INVENTION

Figure 1:
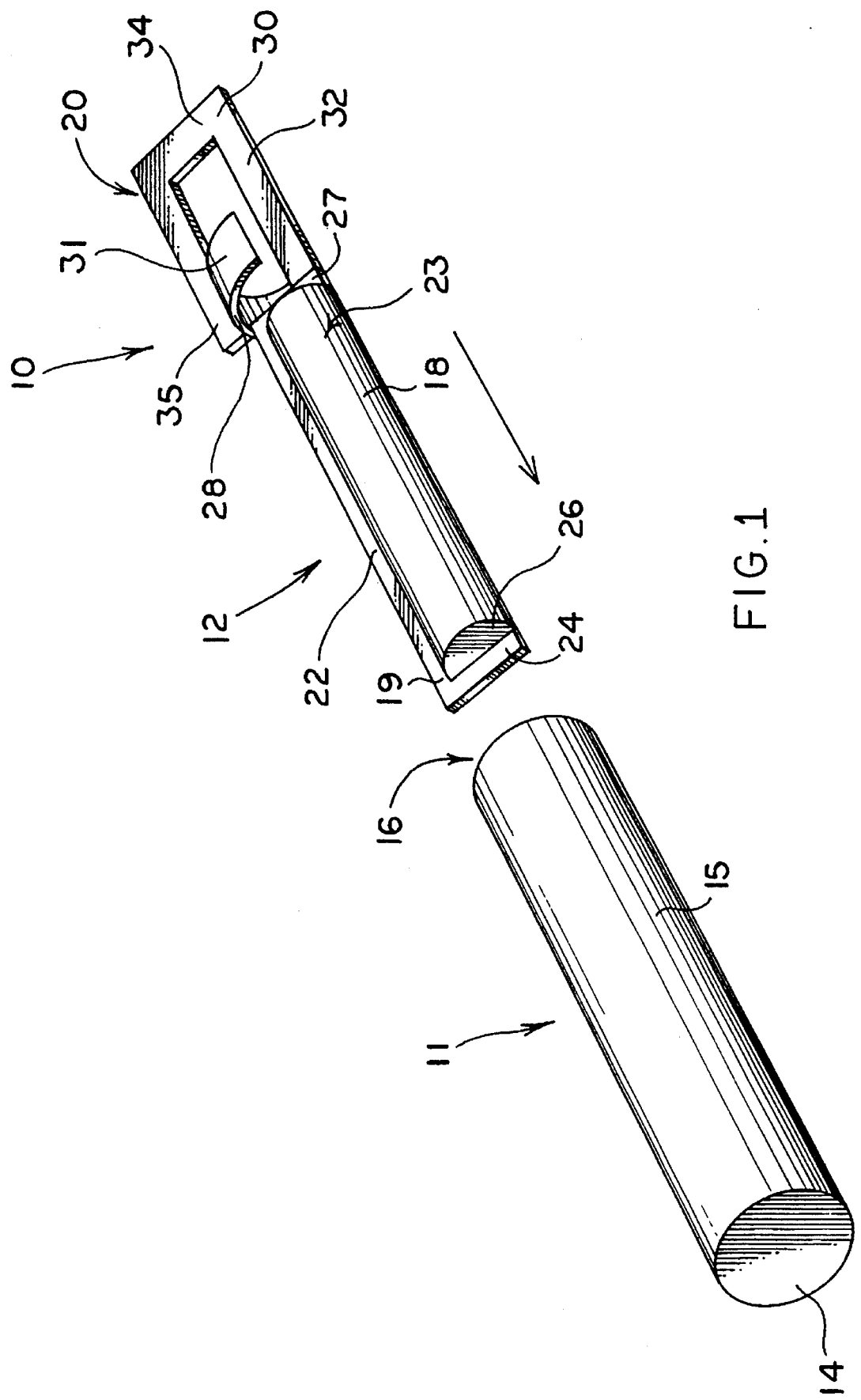
FIG. 1 is a perspective view of a baking mold made in accordance with the concepts of the present invention.

A baking mold assembly made in accordance with the concepts of the present invention is indicated generally by the numeral 10 in the accompanying drawings. With reference to FIG. 1, it can be seen that the mold 10 generally includes a retaining member 11 and a form member 12. With continued reference to FIG. 1 and also to FIG. 4, retaining member 11 is of a generally hollow cylindrical shape having a closed end 14, a circumferential side wall 15 extending from the closed end 14 to form a generally open end 16 opposite closed end 14.

Figure 2:
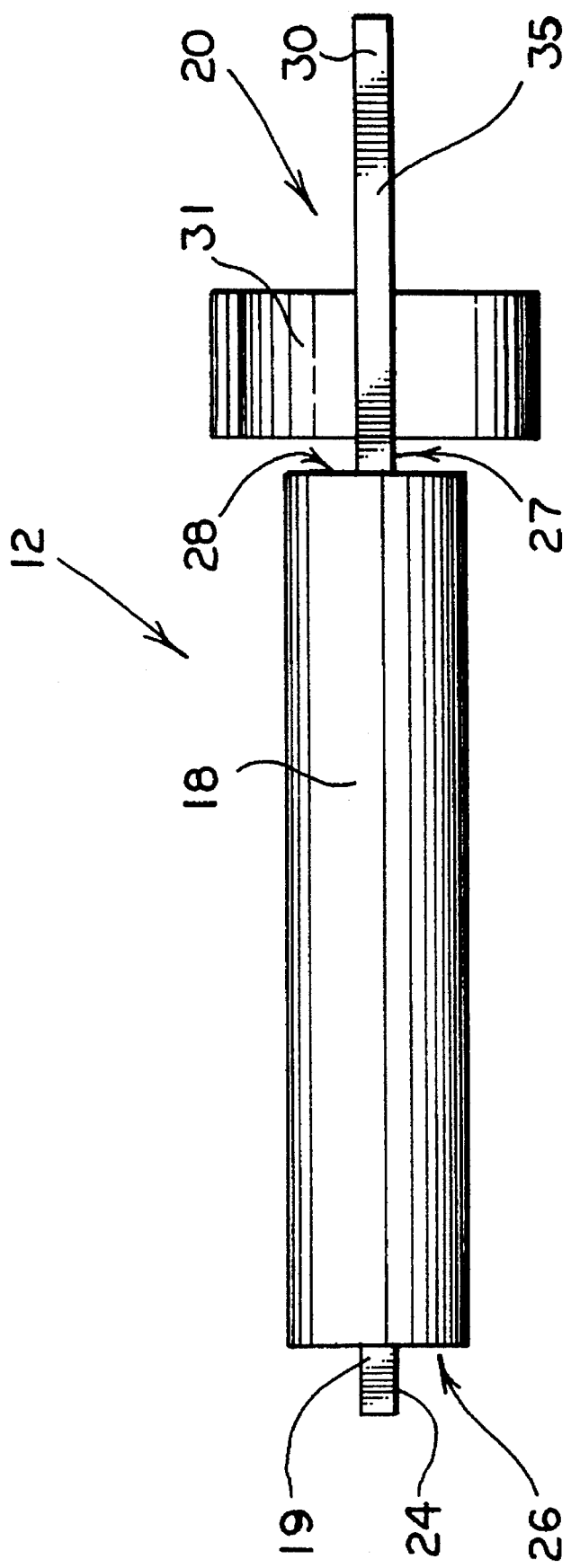
FIG. 2 is a top plan view of the form member shown in FIG. 1.

Referring now to FIGS. 1 through 3, form member 12 includes generally a cylindrical slug portion 18, a spacer rail 19 and a support portion 20. Cylindrical slug portion 18 of form member 12 is, for reasons which will become apparent, substantially smaller in both its diameter and its length than cylindrical retaining member 11. Spacer rail 19 includes a first portion 22 which extends radially outward from the circumferential surface 23 of slug portion 18 co-extensive with the longitudinal axis thereof. A second portion 24 of spacer rail 19 extends axially from a first end 26 of slug portion 18. It should be noted that the second portion 24 of spacer rail 19 is oriented along a central diameter of slug 19 which lies on a common plane with the first portion 22. Similarly, a third portion 27 of spacer rail 19 extends axially from a second end 28 of slug portion 18, along a central diameter lying on a common plane with first portion 22 and second portion 24.

The support portion 20 of form member 12 includes a handle member 30 and a support strap 31. Handle member 30 is defined by a first leg 32, a second leg 34 and a third leg 35. More particularly, first leg 32 extends axially from the second end 28 of slug member 18. The second leg 34 extends orthogonally from the first leg 32 and along the common plane defined by spacer rail 19. Similarly, the third leg 35 extends orthogonally from the second leg 34 parallel to the first leg 32 and as such gives handle member 30 a generally U-shaped configuration.

The support strap 31 is of a semi-cylindrical shape and has an inside radius approximating the outside radius of the circumferential side wall 15 of the retaining member 11. Support strap 31 is mounted to the third leg 35 of handle member 30 such that the axis of the semi-cylindrical support strap 31 is parallel to the longitudinal axis of slug 18. For reasons which will become apparent from the description to follow, the distance between the interior surface 36 of the support strap 31 and the first portion 22 of spacer rail 19, when measured at the point where support strap 31 joins the third leg 35 of handle member 30, should be approximate to the thickness of the circumferential side wall 15 of retaining member 11.

Mold 10 is assembled by inserting form member 12 into retaining member 11 with the second portion 24 of spacer rail 19 leading in the direction of the arrow as shown in FIG. 1. As form member 12 is seated in retaining member 11, support strap 31 of form member 12 will matingly engage circumferential side wall 15 of retaining member 11. At the same time, first portion 22 of spacer rail 19 will frictionally engage the interior of circumferential side wall 15 of retaining member 11. When fully seated, the second portion 24 of spacer rail 19 abuts the interior of the closed end 14 of retaining member 11. Thus, it can be seen that handle member 30, support strap 31 and spacer rail 19 serve to position form member 12 within retaining member 11 in a spaced, non-circumferential relationship.

In actual use, retaining member 11 would be partially filled with an appropriate dough mixture prior to assembly of form member 12 in retaining member 11. Form member 12 would then be inserted as described above and the dough would be allowed to rise. After the dough has risen, the entire assembly may then be placed in an oven for baking. When baking is complete, form member 12 may be extracted from retaining member 11 along with the freshly baked roll. Extraction of form member 12 from retaining member 11 is facilitated by the use of an appropriate, non-stick coating which may be applied to both retaining member 11 and form member 12. Those skilled in the art will now recognize that spacer rail 19 serves a dual function in that not only does it position slug 18 in proper spaced alignment within retaining member 11, but also provides a slot in the roll produced in mold 10. Accordingly, form member 12 may be extracted from the freshly baked roll by withdrawing slug 18 through the bun slot.

Thus, mold 10 serves to produce a generally cylindrical-shaped sandwich roll which has a cylindrical interior cavity formed by slug 18. As such, the roll may be opened at the slot and filled with the desired sandwich components. When closed, the roll serves to maintain the components inside without the mess of previously-known buns or rolls.

The above-described mold thus accomplishes the objects of the present invention and otherwise substantially improves the art.

I claim:

1. A baking mold for a sandwich roll, the sandwich roll having an interior sandwich component cavity, the baking mold comprising: retaining means for holding a portion of dough during the baking process; form means received in said retaining means for forming the cavity in the roll; and support means for positioning said form means in said retaining means, said support means including a handle member attached to said form means and a support strap depending from said handle member.

2. A baking mold according to claim 1 wherein said retaining means includes a hollow cylinder having a closed end and a circumferential side wall extending from said closed end to form an open end opposite said closed end.

3. A baking mold according to claim 1 wherein said form means includes a cylindrical slug portion having first and second ends, and a spacer portion extending outwardly from said cylindrical slug portion.

4. A baking mold for a sandwich roll, the sandwich roll having an interior sandwich component cavity, the baking mold comprising: retaining means for holding a portion of dough during the baking process; form means received in said retaining means for forming the cavity in the roll; said form means including a cylindrical slug portion having first and second ends, and a spacer portion extending outwardly from said cylindrical slug portion and support means for positioning said form means in said retaining means wherein said spacer portion includes a generally flat rail member having first, second, and third portions, said first portion extending radially outward from said cylindrical slug portion co-extensive with the longitudinal axis thereof, said second portion extending axially from said first end of said cylindrical slug portion along a central diameter thereof on a common plane with said first portion, and said third portion extending axially from said second end of said cylindrical slug portion along a central diameter thereof lying on a common plane with said first and second portions.

5. A baking mold according to claim 4 wherein said retaining means includes a hollow cylinder having a closed end and a circumferential side wall extending from said closed end to form an open end opposite said closed end.

6. A baking mold according to claim 5 wherein said support means includes a handle member attached to said second end of said cylindrical slug portion and a support strap depending from said handle member.

7. A baking mold according to claim 6 wherein said handle member includes first, second, and third legs, said first leg extending axially from said second end of said cylindrical slug member, said second leg extending orthogonally from said first leg and along the common plane defined by said first, second, and third portions of said rail member, and said third leg extending orthogonally from said second leg parallel to said first leg such that the distance between said third leg and said first portion of said rail member is approximately equal to the combined thicknesses of said circumferential side wall and said support strap.

8. A baking mold according to claim 7 wherein said support strap depends from said third leg of said handle member and is of a semi-cylindrical shape, having an inside radius approximating the outside radius of said circumferential side wall of said hollow cylinder, so that when said form means is inserted in said retaining means, said support strap rests on said circumferential side wall of said retaining means, whereby said form means is positioned in a fixed spatial relationship with said retaining means.

9. A baking mold for a sandwich roll, the sandwich roll having an interior sandwich component cavity, the baking mold comprising: a retaining member for holding a portion of dough during the baking process, said retaining member including a hollow cylinder having a closed end, a circumferential side wall extending from said closed end to form an open end opposite said closed end; a form member received in said retaining member for forming a cavity in the sandwich roll, said form member including a cylindrical slug portion and a spacer portion extending outwardly from said cylindrical slug portion; and a support member for positioning said form member in said retaining member, said support member including a handle portion connected to said cylindrical slug portion of said form member, and a support strap depending from said handle portion.

10. A baking mold according to claim 9 wherein said spacer portion of said form member includes a generally flat rail member having first, second, and third portions, said first portion extending radially outward from said cylindrical slug portion co-extensive with the longitudinal axis thereof, said second portion extending axially from said first end of said cylindrical slug portion across a central diameter thereof lying on a common plane with said first portion, and said third portion extending axially from said second end of said cylindrical slug portion across a central diameter thereof lying on a common plane with said first and second portions.

11. A baking mold according to claim 10 wherein said handle member includes first, second, and third legs, said first leg extending axially from said second end of said second cylindrical slug member, said second leg extending orthogonally from said first leg and along the common plane defined by said first, second, and third portions of said rail member, and said third leg extending orthogonally from said second leg parallel to said first leg such that the distance between said third leg and said first portion of said rail member is approximately equal to the combined thicknesses of said circumferential side wall and said support strap.

12. A baking mold according to claim 11 wherein said support strap is of a semi-cylindrical shape and has an inside radius approximating the outside radius of said circumferential side wall of said retaining member so that when said form member is inserted in said retaining member, said strap member rests on said circumferential side wall and said first and second portions of said rail member engage the interior of said circumferential side wall and said closed end wall respectively so as to position said form member in a fixed spatial relationship with said retaining member.

13. A baking mold for a sandwich roll, the sandwich roll having an interior sandwich component cavity, the baking mold comprising: a retaining member for holding a portion of dough during the baking process, said retaining member including a hollow cylinder having a closed end, a circumferential side wall extending from said closed end to form an open end opposite said closed end; a form member received in said retaining member for forming the cavity in the sandwich roll, said form member including a cylindrical slug portion and a spacer portion extending outwardly from said cylindrical slug portion, said spacer portion including a generally flat rail member, said rail member having first, second and third portions, said first portion extending radially outward from said cylindrical slug portion co-extensive with the longitudinal axis thereof, said second portion extending axially from said first end of said cylindrical slug portion along a central diameter thereof lying on a common plane with said first portion, and said third portion extending axially from said second end of said cylindrical slug portion across a central diameter thereof lying on a common plane with said first and second portions; and a support member for positioning said form member in said retaining member, said support member including a handle portion connected to said cylindrical slug portion of said form member, and a support strap depending from said handle portion, said handle member including first, second and third legs, said first leg extending axially from said second end of said cylindrical slug member, said second leg extending orthogonally from said first leg and along the common plane defined by said first, second and third portions of said rail member and said third leg extending orthogonally from said second leg parallel to said first leg such that the distance between said third leg and said first portion of said rail member is approximately equal to the combined thicknesses of said circumferential side wall and said support strap, and said support strap is of a semi-cylindrical shape and has an inside radius approximating the outside radius of said circumferential side wall of said retaining member so that when said form member is inserted in said retaining member, said strap member rests on said circumferential side wall, and said first and second portions of said rail member engage the interiors of said circumferential side wall and said closed end wall respectively so as to position said form member in a fixed spatial relationship with said retaining member.

\* \* \* \* \*